3,320,031
DIOXYGEN CHLORINE TRIFLUORIDE
Aristid V. Grosse and Alex G. Streng, Philadelphia, Pa., assignors to the United States of America as represented by the Secretary of the Navy
No Drawing. Filed Mar. 22, 1963, Ser. No. 267,369
1 Claim. (Cl. 23—203)

This invention relates to a new type of high energy oxidizer and particularly to dioxygen chlorine trifluoride and various processes of making the same.

Solid-propellant technology, with few exceptions, is based on the oxidation of hydrogen and carbon atoms by a high energy oxidizer. An object of this invention is to provide a new chemical having a remarkable oxidizing power even at low temperatures and various processes of making the same.

Other objects and many of the attendant advantages of this invention will be readily appreciated as the same become better understood by reference to the following detailed description.

A new type of high energy oxidizer, dioxygen chlorine trifluoride, having the formula $O_2ClF_3$ may be prepared by the addition of chlorine fluoride to dioxygen difluoride in line with the formula:

$$O_2F_2 + ClF \rightarrow O_2ClF_3$$

if the reaction is carried out under mild conditions at a temperature from just above the melting point of chlorine fluoride (119° K.) up to 130° K. This oxidizer has an intense violet color and hue very similar to that of the organic dye methyl violet. This new oxidizer was obtained in a purity of 81%, the other 19% being nearly colorless chlorine trifluoride. It is a solid and thermally stable up to 195° K. at which temperature it may be kept for over a year. It has a vapor pressure of less than 12 microns at 158° K.; at which temperature and pressure it dissociates into its components which may be collected on a liquid nitrogen finger (77° K.). If the finger is warmed up to 119° K. to 140° K., the violet compound forms again.

This oxidizer is insoluble in liquid $O_2$ and $O_3$ at 90° K., in liquid $ClO_3F$ and $C_3F_8$ at 140° K., and in liquid $NF_3$, $CCl_2F_2$, and $CClF_3$ at 160° K. It is however soluble in ClF at 125° K., $O_2F_2$ at 140° K. and $ClF_3$ at 190° K. It is also readily soluble in anhydrous HF at 190° K., forming a deep violet solution. The solubility in HF is high and a 65 weight percent or 23 mole percent of the oxidizer solution is not saturated at 190° K. This solution is not an electrolyte. A 0.5 M solution of $O_2ClF_3$ in HF had a specific conductivity of $3.57 \times 10^{-3}$ ohm$^{-1}$ cm.$^{-1}$ at 195° K., while the pure anhydrous HF used had the same conductivity. After decomposition, the residual clear and colorless solution of $ClF_3$ in HF also had the conductivity of $3.57 \times 10^{-3}$ ohm$^{-1}$ cm.$^{-1}$. In contrasts, a 0.5 M solution of a typical electroylte, KF in HF, has a specific conductivity of 86.0 ohm$^{-1}$ cm.$^{-1}$, or approximately 25,000 greater. Thus the possibility that this violet compound might be ionic or saltlike, dissociating, for example into ions is excluded. The stability of this new oxidizer in anhydrous HF is much less than that of the pure compound. It shows a remarkable dependence on the partial pressure of oxygen. At an $O_2$ pressure of 1.0 to 1.5 atm. and 195° K. the concentrated solution can be kept for many hours; when the $O_2$ pressure is reduced to 50 to 20 mm. of Hg the deep violent solution decolorizes in a few minutes by decomposition to oxygen and chlorine trifluoride.

PREPARATION OF DIOXYGEN CHLORINE TRIFLUORIDE

*Example 1.—Preparation by direct addition of pure $O_2F_2$ to pure ClF*

1.130 grams of $O_2F_2$ wer vacuum-distilled into a borosilicate glass reaction vessel (Kel-F-test tubes may also be used) of about 100 cc. volume, melted, distributed evenly on the walls of the lower half of the reaction vessel by rotation, and frozen at 90° K. The stoichiometric amount (1:1 mole) or 0.880 gram of ClF (measured as a gas) was added in portions of 100 mg. After each addition, the reaction vessel was warmed up to 119° K. (melting point of ClF) and then slowly to 140° K. The violet compound, $O_2ClF_3$, is rapidly formed, by direct addition, while simultaneously a white solid, $Cl_3$, is also formed, coupled with the evolution of $O_2$ and small and varying amounts of $F_2$.

If the reaction is carried out without special precautions, the two substances readily react to form oxygen and chlorine trifluoride following the stoichiometric equation:

$$O_2F_2 + ClF \rightarrow O_2 + ClF_3$$

with $H_{298} = -30.1$ kcal. per mole. Assuming that the heat of formation of $O_2ClF_3$, as well as its heat of decomposition, is about half—i.e. 15 kcal. per mole—of the total heat of the above reaction, one can readily understand that overheating can lead to the decomposition of $O_2ClF_3$ as follows:

$$O_2ClF_3 \rightarrow O_2 + ClF_3$$

The same overheating can also lead to a simple decomposition of $O_2F_2$ as follows:

$$O_2F_2 \rightarrow O_2 + F_2$$

The extent of each reaction can be determined by simple analysis of the gases for $O_2$ and $F_2$, since only the latter reaction leads to elementary fluorine and the reaction desired takes place without the evolution of $O_2$ or $F_2$.

After each addition, the reaction vessel was again cooled to 90° K., $O_2$ and $F_2$ were evacuated (and collected, if desired), a fresh portion of ClF was added, and the cycle repeated. In a typical experiment following the procedure outlined in Example I, only negligible traces of $F_2$ were found, while the amount of $O_2$ evolved equaled 205.8 cc. (NTP) or 0.294 gram of $O_2$. Thus, all the oxygen liberated was due only to the decomposition of $O_2ClF_3$, corresponding to 56.9 weight percent of the $O_2F_2$ used. The rest, or 43.1 weight percent, combined with ClF to form the oxidizer $O_2ClF_3$. Thus, the yield was 43.15% of theory.

TABLE I.—OVER-ALL MATERIAL BALANCE (1) Reagents Used: Grams
  $O_2F_2$ _____ 1.130
  ClF _____ 0.880

(2) Products formed:
  $O_2ClF_3$ (by calculation) _____ 0.869
  $O_2$ (by analysis) _____ 0.294
  $F_2$ (by analysis) _____ 0.000
  $ClF_3$ (by difference) _____ 0.847

*Note.*—After decomposition of $O_2ClF_3$, the total amount of $ClF_3$ produced in preparation equaled 1.493 grams, as determined by direct weighing.

*Example 2.—Preparation from $O_2F_2$ and ClF in presence of solvent*

1.51 grams of $O_2F_2$ and 15.32 grams of $C_3F_8$ were cooled in a borosilicate glass reaction vessel to 130° K. In a second tube, the equivalent amount of ClF (1.17 grams) was dissolved in 13.58 grams of $C_3F_8$ and distilled into the reaction vessel. At 150° K. over 33 weight percent of ClF are soluble in $C_3F_8$; at 160° K., the ClF mixes homogeneously with the $C_3F_8$. The solvent $C_3F_8$ was then readily pumped off, in a vacuum, preferably at 130° K. to 140° K.

The yield of $O_2ClF_3$ was substantially increased by carrying out the reaction in the presence of an inert solvent such as perfluoropropane, $C_3F_8$ (M.P. 90° K., NBP 235° K.). It was found that ClF reacted immediately with the $O_2F_2$, forming $O_2ClF_3$, which being practically insoluble in $C_3F_8$, deposited on the walls of the reaction vessel. The yield and concentration of $O_2ClF_3$ were increased to 81.0% of theory following this procedure. In all, 91.0 cc. of $O_2$ (NTP) were evolved, accompanying the formation of $ClF_3$, which contaminated the $O_2ClF_3$ to an extent of 19.0 weight percent.

It has been found that $Cl_2$ and HCl may be substituted for ClF as starting materials in the direction addition reaction. For example $O_2ClF_3$ is also formed, if $Cl_2$ is added to $O_2F_2$. Here, the first step is the fluorination of $Cl_2$ to ClF, following the equation $$O_2F_2 + Cl_2 \rightarrow O_2 + ClF$$

After ClF is formed, it reacts with $O_2F_2$, as heretofore set forth, to form $O_2ClF_3$. As for HCl, it reacts at 130° K. to 140° K. with $O_2F_2$, in accordance with the stoichiometric equation:

$$2O_2F_2 + HCl \rightarrow O_2ClF_3 + HF + O_2$$

The reaction steps probably first consist in the formation of $Cl_2$ and then ClF, in line with the equations:

$$O_2F_2 + 2HCl \rightarrow 2HF + O_2 + Cl_2$$
$$O_2F_2 + Cl_2 \rightarrow 2ClF + O_2$$

the ClF formed in the latter stage reacting in the usual manner to form $O_2ClF_3$. Since the above fluorination reactions of both HCl and $Cl_2$ are exothermic, the yields of $O_2ClF_3$ are lower than with ClF as heretofore described. At 130° to 140° K. HCl is a solid (M.P. 158.9° K.) but has a vapor pressure of 10 mm. of Hg at 140° K. Thus, the reaction takes place between gaseous HCl and gaseous or liquid $O_2F_2$. The violet compound partly deposits on the walls of the reaction vessel, but also dissolves in liquid $O_2F_2$. Solutions containing up to 8.5 weight percent $O_2ClF_3$ in $O_2F_2$ were obtained. At temperatures above 140° K. the reaction proceeds rapidly, with substantial amounts of $O_2ClF_3$ decomposing to $O_2$ and $ClF_3$.

The violet compound, $O_2ClF_3$, is a very strong oxidizer, even at low temperature. In this respect it is similar to the highly reactive ozone, which, for example, reacts with $NH_3$ even at 150° K. A study was made of the utility of $O_2ClF_3$ as a research tool and oxidizer of fuels. The oxidizer was reacted with $NH_3$, the hydrocarbons $C_2H_6$, $C_2H_4$, and $C_6H_6$, and water.

*Reaction with $NH_3$*: When gaseous $NH_3$ is suddenly admitted to a reaction vessel containing $O_2ClF_3$ at 90° K., reaction takes place with a flash, forming white solids and some nitrogen containing gases, while the violet color disappears. If the ammonia is condensed first in the upper part of a reaction tube cooled to 90° K., the reaction proceeds slowly as the vessel is warmed to 150° to 160° K. Ammonia has a vapor pressure of about 1 mm. at 160° K. and reacts slowly as a gas with the solid $O_2ClF_3$. Under these conditions, the reaction proceeds smoothly without any gas evolution, while the violet color disappears and a white solid is formed. Under the same conditions pure solid $ClF_3$ reacts more slowly; this is to be expected, since, in any reaction with a fuel, the components formed from $O_2ClF_3$—i.e. $O_2$ and $ClF_3$—are activated by the endothermic heat of formation ($H_{298}$ assumed to be equal to $+15 \pm 10$ kcal. per mole.) Ammonium fluoride, other ammonium salts, HF, HCl and the oxy-acids of chlorine (either free or as ammonium salts) were identified among the reaction products. Hydrogen fluoride was identified by vacuum distillation, formation of $N_aF \cdot HF$, and titration. Hydrogen chloride was identified through formation of silver chloride. Ammonia was determined quantitatively by Kjeldahl's method. The oxynitrogen acids or oxychlorines were identified quantitatively by Lunge's reaction. Anions of the oxychlorine acid—i.e., chlorite, chlorate, or perchlorate—were identified by reduction with zinc to chloride ions.

*Reactions with hydrocarbons*: Ethane, $C_2H_6$, when admitted to $O_2ClF_3$ at a temperature of 140° K., reacts immediately. The violet color of $O_2ClF_3$ disappears and white solids are formed, but no gas is evolved. When ethylene gas was introduced into a reaction vessel containing 1.39 grams of $O_2ClF_3$ a reaction immediately took place causing the decolorization of the violet compound and the formation of white solid products. In this case $O_2ClF_3$ was initially cooled to 120° K. and the ethylene gas was introduced in portions of about 5 mg. at a rate of about 1 mg. per second. On one occasion, a total of 0.179 gram of ethylene was added to 1.3 grams of $O_2ClF_3$, the temperature of the bath was slowly raised after this addition at the rate of 10 to 15° per minute. No gas evolution was noticed up to 140° K. At 140° K., a violent explosion took place. Evidently, intermediate and partly oxidized products were formed. In all reactions with $O_2ClF_3$ with hydrogen-containing substances, HF is the most likely product. Carbonyl fluoride, $COF_2$, and other intermediate oxyfluorides—for example, oxalyl fluoride, $C_2O_2F_2$—may be formed. In view of the violent explosion which took place, it is also likely that some C–H containing compounds were present. $O_2ClF_3$ also reacts violently with a solution of benzine in HF at 195° K. A few milligrams of $C_6H_6$ dissolved in HF, were distilled over into a Kel-F reaction vessel containing a 1 to 2% solution of $O_2ClF_3$ in HF, and frozen on the walls above the $O_2ClF_3$. The tube was then warmed to 195° K.; the melting HF began to run down, carrying the $C_6H_6$. Sparks were observed when the $C_6H_6$ came into contact with the $O_2ClF_3$ solution and the violet color disappeared rapidly.

*Reaction with water*: Pulverized ice, cooled to 90° K., was added to $O_2ClF_3$ contained in a tube and the tube was slowly warmed. A visible reaction started at about 130° K. with gas evolution and the formation of a white solid. Oxygen was liberated and HF and ClOH (or $ClO_2H$) were formed. The reaction proceeded much better at a higher temperature.

It is apparent from the foregoing description that we have invented a new type of high energy oxidizer namely, $O_2ClF_3$, dioxygen chlorine trifluoride which due to its activity may be used to oxidize such things as fuels.

Obviously, many modifications and variations of the present discovery will become apparent to one skilled in the art in view of the above teaching so that it is to be understood that this invention, as set forth in the appended claim, may be practiced otherwise than as described.

We claim:

Dioxygen chlorine trifluoride having the formula $O_2ClF_3$.

References Cited by the Examiner

"Fluorine Chemistry," vol. 1, 1950 edition, by Simons, J. H., pp. 82–85 and 192–194, Academic Press Inc., publishers, New York, N.Y.

OSCAR R. VERTIZ, *Primary Examiner.*

EDWARD STERN, *Examiner.*